Oct. 22, 1929.  R. PAWLIKOWSKI  1,732,856
CYLINDER FOR PISTON ENGINES
Filed March 7, 1928  6 Sheets-Sheet 1

Inventor
Rudolf Pawlikowski
Dipl. Ing.

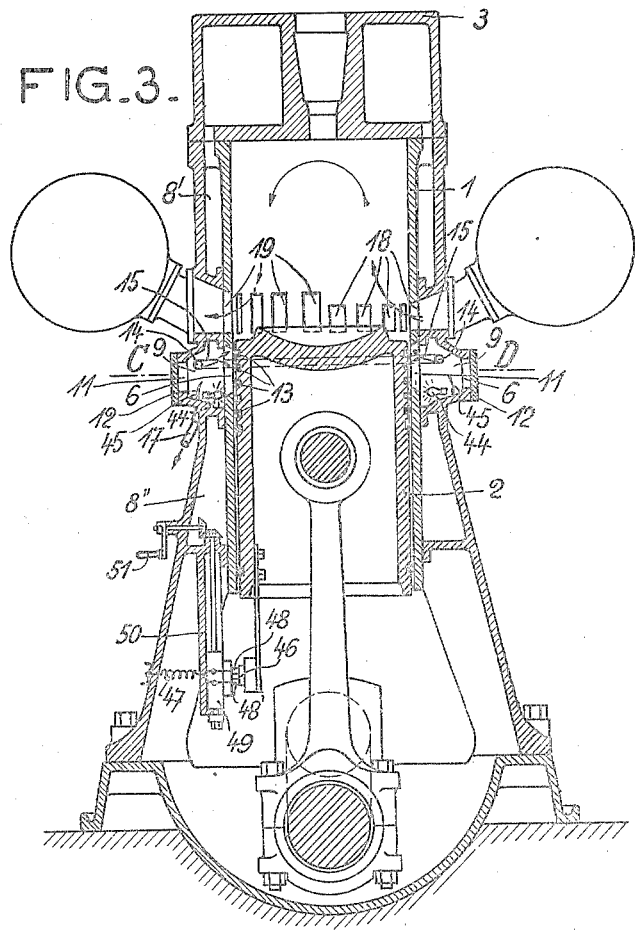
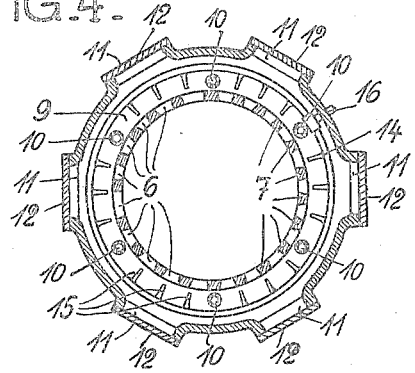

Oct. 22, 1929.  R. PAWLIKOWSKI  1,732,856
CYLINDER FOR PISTON ENGINES
Filed March 7, 1928  6 Sheets-Sheet 3
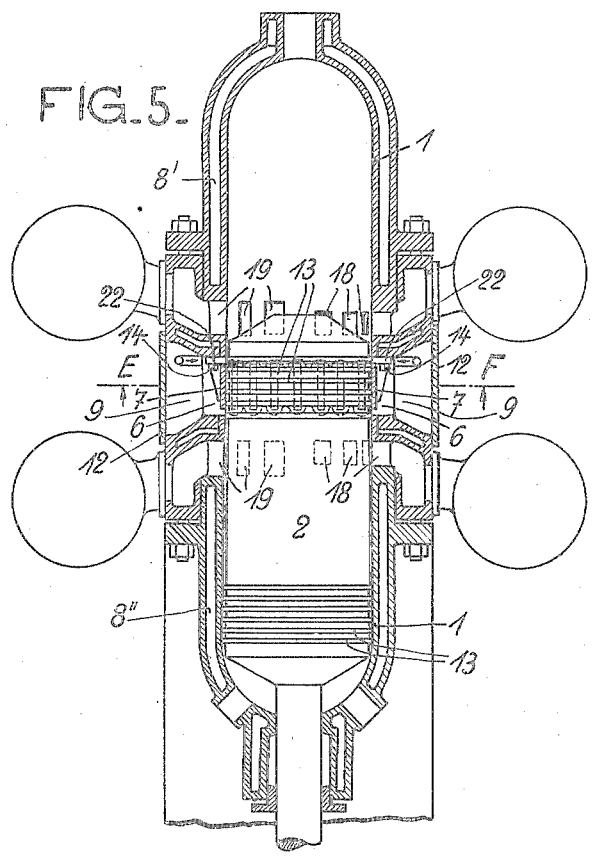
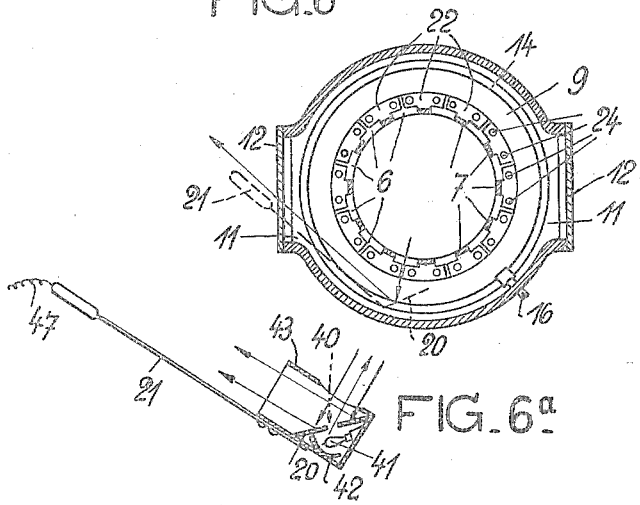
Inventor:
Rudolf Pawlikowski

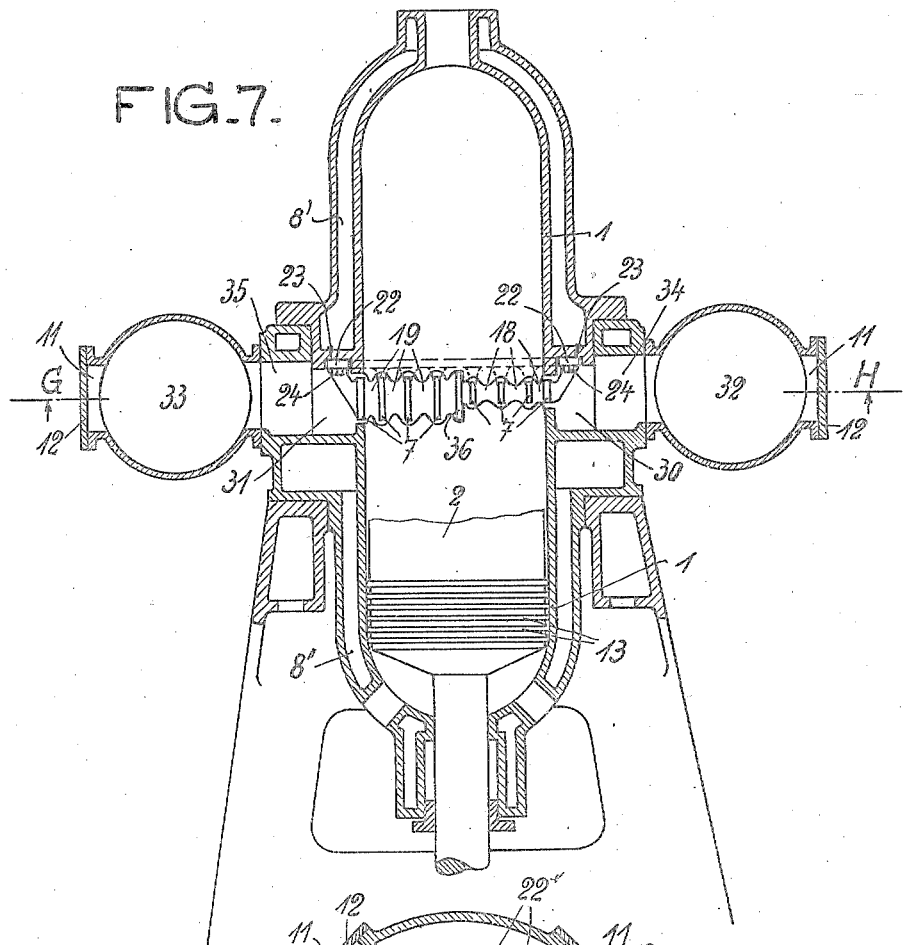
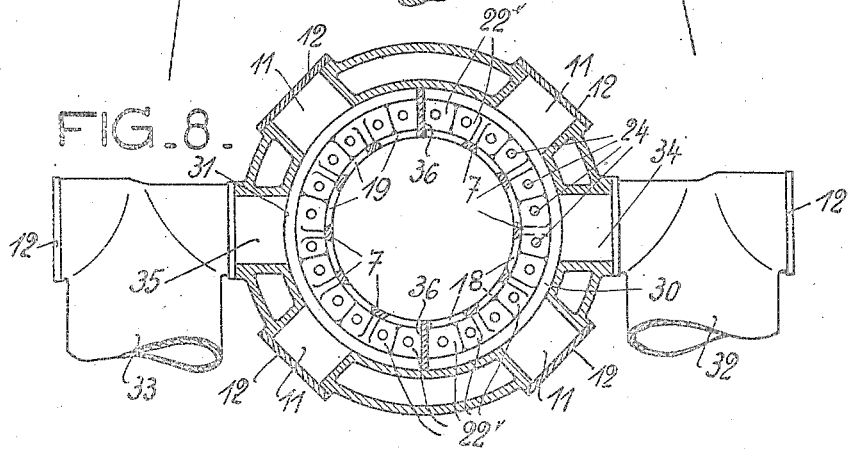

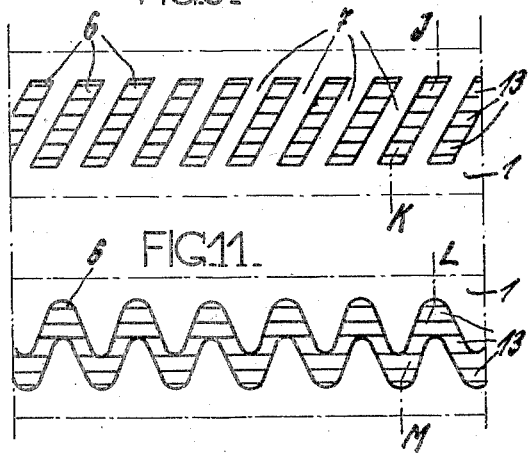
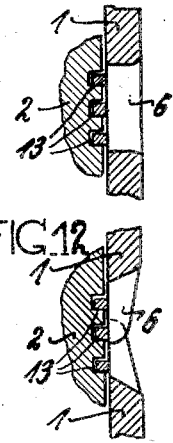
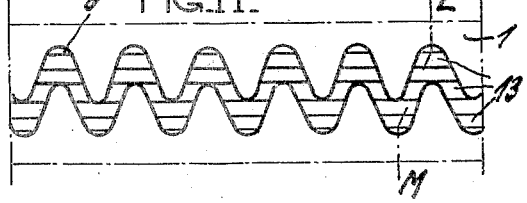
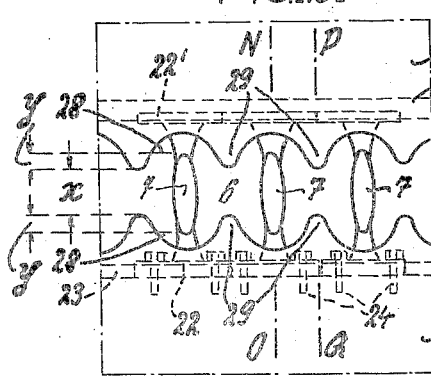
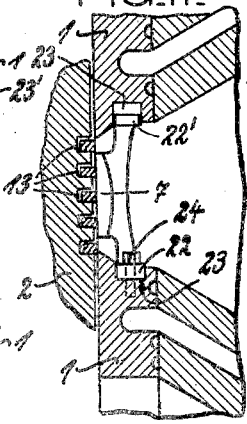
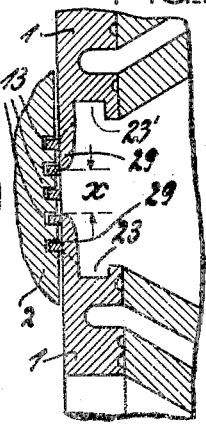
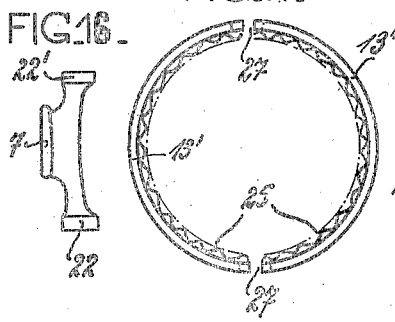
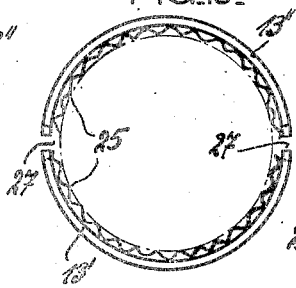
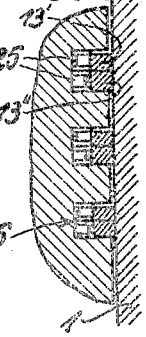

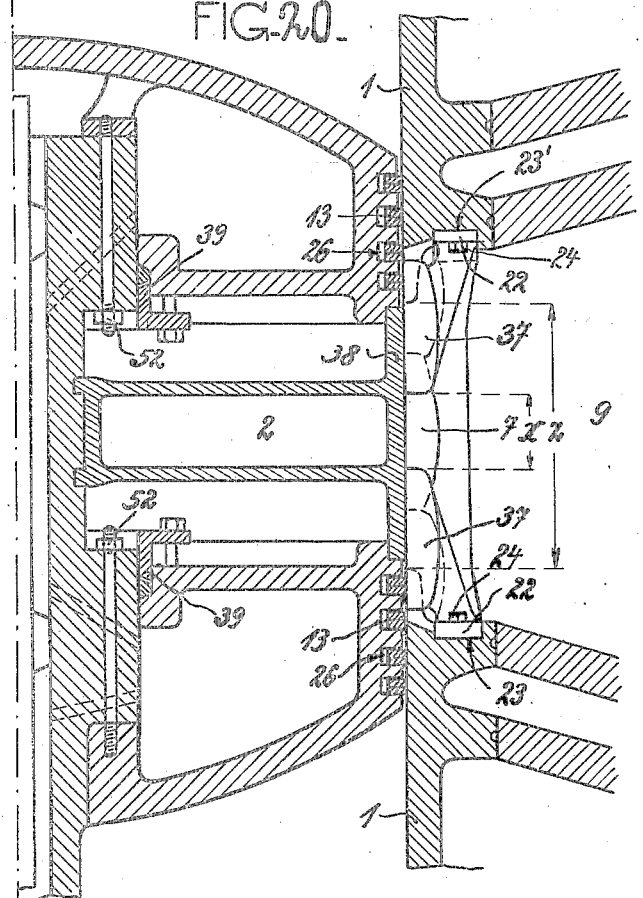
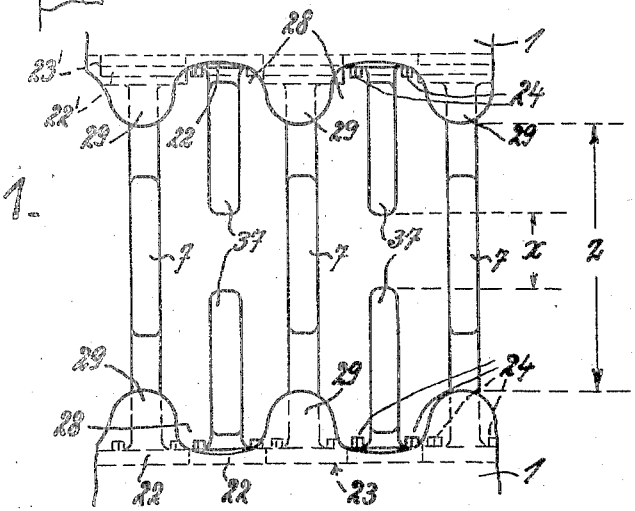

Patented Oct. 22, 1929

1,732,856

UNITED STATES PATENT OFFICE

RUDOLF PAWLIKOWSKI, OF GOERLITZ, GERMANY

CYLINDER FOR PISTON ENGINES

Application filed March 7, 1928, Serial No. 259,810, and in Germany December 16, 1926.

The invention relates to cylinders for piston engines of all types and has for its object to have cylinders for such engines which allow of the sliding faces of the piston rings to be inspected and controlled from outside at any time without the piston needing to be dismounted. The invention is in particular adapted to be used in internal combustion engines, in which, as it is well-known, more or less unburnt residues remain always in the working cylinder, which are not always expelled with the waste gases, but arrive between the piston and the cylinder wall, where they have a noxious effect. The invention affords a means for both easily ascertaining and removing such particles of dirt, oil coke, ash and the like arriving at and between the piston rings without the engine needing to be stopped or even disassembled.

The invention substantially consists in the fact, that the piston rings come to arrive at the end or near the end of the stroke opposite holes provided in the cylinder wall and extending on the entire circumference thereof, through which holes the piston rings may be made visible and accessible even during the engine is in operation. Furthermore, the piston rings arriving opposite these inspecting holes may be cleansed by a washing means and thus freed from impurities. The well portions or bridges remaining between the individual inspecting holes of the cylinder wall are advantageously made so as to be withdrawn, so that a slot extending round about the cylinder wall is obtained after withdrawal of these intermediate wall portions. This slot allows without any further disassemblage of the piston rings, that are suitably designed as divided rings, to be thoroughly cleansed or dismounted, replaced, and mounted anew. Besides, the open space obtained in the cylinder wall by withdrawing said intermediate wall portions may be made so wide, that the piston is accessible through it without dismounting the driving gear of the engine, so that for instance the halves of the guiding cover of the piston may be removed or the stuffing box packings of the cooling chamber of the piston may be re-adjusted and other work may be done on the piston.

In order to allow of the invention to be more easily understood, some preferred embodiments of same are illustrated by way of example in the drawings which accompany and form part of this specification and show vertical internal combustion engines designed according to the invention. In these drawings:

Figure 3 is a vertical longitudinal section through a single-acting two stroke cycle engine, and Figure 4 is a horizontal section on line C—D of Figure 3.

Figures 5 and 6 are a vertical section and a horizontal section on line E—F of Fig. 5 through a double-acting two stroke engine.

Figure 1:
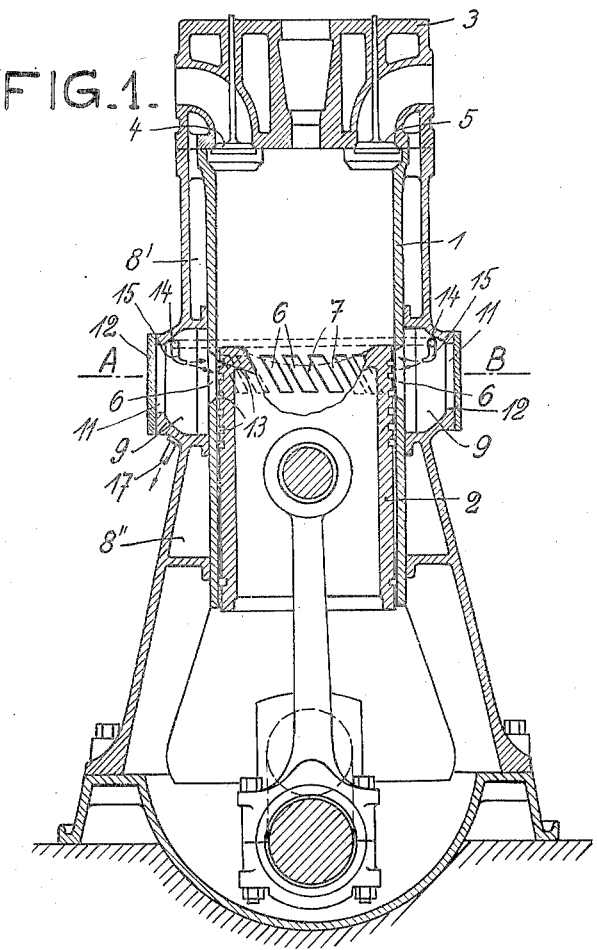
Figure 1 is a vertical longitudinal section through a four stroke cycle engine.

Fig. 6ª illustrates an illuminating and inspection instrument for use with the invention.

Figures 7 and 8 show in a vertical section and a respective horizontal section on line G—H of Fig. 7 a modification of a double-acting two stroke engine, Figures 9, 11, and 13 are fragmentary illustrations of the cylinder wall rolled out on a plane and showing several embodiments of the inspecting holes, Figures 10, 12, 14 and 15 are appurtenant sections on lines J—K, L—M, N—O, and P—Q of Figs. 9 and 13, respectively.

Figure 16 shows a detail.

Figures 17 to 19 show an example of a piston ring adapted to be used in connection with the cylinders designed according to the invention.

Figure 20 is a fragmentary vertical section in an enlarged scale showing a further embodiment, whilst Figure 21 is an appurtenant development.

Referring first to the engine illustrated in Figures 1, 2, 3, and 4, 1 denotes the working cylinder, in which the piston 2 reciprocates. 3 denotes the cylinder cover including the inlet and outlet valves 4 and 5. The construction shown in Figures 3 and 4 is a similar one, but this engine is fitted instead of controlled cover valves 4, 5 with the well-known inlet and outlet ports 18 and 19 in the cylinder wall 1 that are uncovered by the reciprocating piston. In the cylinder wall 1 of these two engines are provided ports 6 which are located about at the level of the lower dead center point of the piston and between which ports remain intermediate wall portions or bridges 7. Around the ports 6 the cooling water jacket 8′ 8″ of the cylinder is interrupted and replaced by a circular chamber 9 through which pass water pipes 10 that interconnect the two parts 8′ 8″ of the water jacket. The chamber 9 has openings which may be closed by covers 12. The latter are made partly or wholly of a transparent material or may be opened, so that the interior of the chamber 9 and the inspecting holes 6 may be inspected from outside. Behind the ports 6 reciprocates the piston 2 with its rings 13. Advantageously the ports 6 are arranged inclinedly in the cylinder wall, see Figures 1 and 9, or form a continuous wavy line, see Figure 11, in order to allow as far as possible of all places of the circumference of the piston rings 13 to become visible through the ports 6 during the up and down motion of the piston. The ports are with advantage arranged at such a level, that with the piston in lowermost position the upper rings 13 are just opposite the ports. As the motion of the piston is retarded in the vicinity of the dead center point, a sufficiently long time is at disposal for the control of the piston rings 13, without the engine needing to be stopped.

Figure 2:
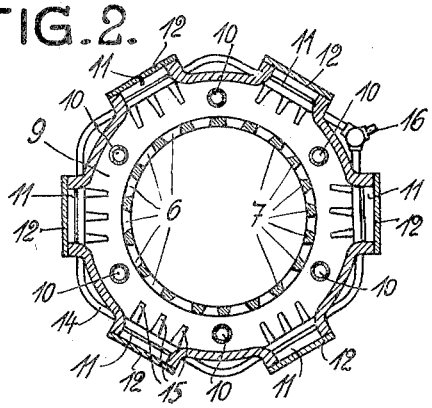
Figure 2 is a horizontal section on line A—B of Figure 1.

As shown in Figure 3, incandescent lamps 44 may be arranged in the chamber 9, which lamps are preferably screened outward by means of reflectors 45 that project the light into the ports 6 and onto the piston rings 13. The incandescent lamps 44 need not to lighten permanently, but eventually only when the piston rings 13 to be inspected pass just past the ports 6. To this end the lamps 44 are e. g. inserted in an electric circuit, the contacts of which are intermittently closed for a short time by any moving part of the engine, e.g. by the reciprocating piston 2, as shown in Figure 2. To this end the piston carries a sliding piece 46 by which the contact pieces 48, 48′ of the lamp circuit are bridged at the given moment, whereby the circuit is closed and the lamps 44 come to lighten. The contact pieces 48, 48′ are mounted on a shiftable gliding block 49 which may be adjusted in height along a guide 50 from outside by means of a crank 51 or a similar means. This arrangement allows of the lightening of the lamps 44 to be adjusted on every individual piston ring 13 and the rings lighten one after the other upon the respective ring just being visible through the inspecting ports 6. When shortly but powerfully lightened in this manner, the piston rings appear to the inspector even when in motion as stationary, whereby a satisfying possibility of controlling them is afforded. With high speed engines flashing electric sparks may be employed with advantage to intermittently lighten the piston rings, instead of incandescent lamps. These sparks afford the desired quick illumination, as in this case no incandescent wire must be heated up to incandescent temperature.

A circular spurting pipe 14 is arranged in chamber 9 which pipe spurts either through ordinary holes or through special nozzles 15 a cleansing means, such as oil, oil emulsion or soapy water, through the inspecting holes 6 onto the piston rings 13 which thereby are cleansed. The cleansing means is supplied to the spurting pipe 14 at 16 by means of a suitable pump (not shown). Advantageously this pump works intermittently, so that the cleanser is delivered through the nozzles 15 only the instant the piston rings 13 are just opposite the ports 6 or are passing past therein. The upper and lower edges of the ports 6 are provided with wipers, or special wipers are here built in, which wipe off the superfluous cleanser from the piston rings and lead it again to the chamber 9, from which it is drawn off at 17 together with the impurities removed from the piston. After having been purified by settling or filtering, the cleanser may be used again for the described cleansing operation.

In the double-acting two stroke cycle engine illustrated in Figures 5 and 6 the inspecting chamber 9 with the inspecting and cleansing ports 6 is located between the usual inlet and outlet ports 18, 19, which are present here for each cylinder side separately. The chamber 9 has again admission openings 11 which preferably are arranged opposite each other at right angles relatively to the engine shaft. The remaining sections of the chamber 9 must have no openings, as e. g. with multicylinder engines openings that would be located between the shown openings 11, would not be easily accessible for inspection due to the close vicinity of the cylinders. The portions, not directly located opposite the inspecting openings 11, of the piston rings 13 may be likewise inspected from outside by means of mirrors 20, see Figure 6, which may be arranged in a suitable manner in chamber 9. As shown in Figure 6ª, such a mirror may also be fixed on a holder 21 and introduced by hand in chamber 9 when the piston rings are to be inspected. The necessary illumination of the interior of chamber 9 is preferably effected by incandescent lamps or the like arranged therein. The mirrors may further be designed as the well-known ophthalmoscopes the mirror of which has a central hole and a source of light arranged behind it, by means of which the entire circumference of the piston, may be lightened. An inspecting and lightening implement of this type is illustrated in Figure 6ª. This implement consists of a holder 21 having a suitable handle on the free end of which is mounted a mirror 20 at a suitable angle. The mirror 20 may be displaceable and adjustable, to impart to it the position which is most favorable for the inspection of the piston rings. It possesses a central hole 40 and an incandescent lamp 41 mounted behind it. The rays of light emitted by the lamp 41 are collected by a concave mirror 42 and projected through hole 40 of mirror 20 onto the inspecting ports 6, the illuminated image of which together with the piston rings 13 visible through them may thus be easily perceived from outside. The top of holder 21 with mirror 20, lamp 41 and reflector 42 may be lodged in a tubular piece 43, to collect all rays of light and to obviate disturbing reflections. Like the arrangement illustrated in Figure 3, the described inspecting implement may be electrically connected by its wires 47 to a contact 48, 48'. The source of light then likewise flashes for a short time just at that moment the piston ring to be tested is passing past the inspecting ports 6.

The intermediate bridges 7 existing between the inspecting ports 6 and guiding the piston rings are advantageously made so as to be exchanged. They are screwed on one side on the cylinder liner by means of their laterally bent end portions 22, see Figure 5. The other end of the bridges 7 is preferably free to move in longitudinal direction, so that eventual heat stresses may be compensated for. A particularly well suited manner of fixing these removable bridges 7 is illustrated in enlarged scale in Figures 13 to 15. These bridges 7, Figure 16, possess lower and upper guiding and fastening lugs 22 and 22'. The lower lugs 22 fit into a corresponding groove 23 of the cylinder liner 1 and are fixed therein by screw bolts 24. The upper lugs 22' are guided in a similar groove 23' in a manner so as to secure the bridge 7 against lateral displacement but to permit its free dilatation in longitudinal direction. The grooves 23 and 23' of the cylinder liner may be machined as well as the abutting faces of the lugs 22, 22', to obtain an exact fit and adjustment. Furthermore, the inwardly directed slide faces, serving to guide the piston rings 13, of the bridges 7 are exactly turned out with the diameter of the cylinder. This is effected with advantage by screwing the bridges 7 with their lugs 22 on the respective portion of the cylinder liner 1 and turning them together with the latter on the lathe.

When all bridges 7 are removed, a circular gap $x$ is obtained in the cylinder wall 1, see Figures 13 and 15, through which gap the piston rings 13 may be removed and inserted without it being needed to dismount the piston 2. To this end, the piston rings each consist of at least two parts 13', 13'', which are urged outward, in a manner known in itself, by inside springs 25, see Figures 17 to 19. Preferably two piston rings 13 having joints 27 displaced 90 degrees are lodged in a common piston groove 26. As shown in Figure 13, the edges of the cylinder liner 1 are urged so as to form indentations 28, into which the bridges 7 project. The projections 29 thus formed on the edges of liner 1 guide the piston rings 13 until these have come to glide on the bridges 7. It is thus at the distance denoted by $y$ in Figure 13, that the piston rings are guided both by the projections 29 of liner 1 and by the bridges 7.

As in the double-acting two stroke cycle engine illustrated in Figure 5 special inspecting ports 6 are arranged between the usual fuel inlet and outlet ports 18, 19, the structural height of this engine is somewhat great, which disadvantage is obviated by the modification shown in Figure 7. In this engine the usual inlet and outlet ports 18, 19 are at the same time utilized as inspecting ports according to the invention. To this end the inspecting and admission openings 11 are arranged in the scavenging air chamber 30 and exhaust chamber 31, and are closed by covers 12. The latter are either hingedly fixed or windows are provided therein, so that one may look through them into the chambers 30, 31 and inspect through the usual inlet and outlet ports 18, 19 the piston rings 13 reciprocating behind them. The air supply pipe 32 and exhaust pipe 33 are also equipped with inspecting openings 11 with covers 12 opposite the air admission 34 and exhaust passage 35.

In this modification too the bridges 7 arranged between the ports 18, 19 are removable, furthermore, the partitions 36 separating the scavenging air chamber 30 and exhaust chamber 31 may be removable. They are fitted like the bridges 7 with fastening lugs 22' by means of which they are screwed into grooves 23 of the cylinder liner 1 or fixed thereon in any other suitable manner. In this way in this modification too an annular gap is obtained in the cylinder liner 1 through which gap the piston rings 13 may be removed and inserted again.

In the modification illustrated in Figures 20 and 21 two different sorts of bridges 7 and 37 are provided for guiding the piston rings 13 between the two parts of the cylinder liner 1. When the bridges 7 are withdrawn, an annular gap of the width denoted by $x$ is obtained in the cylinder wall 1 which gap suffices to exchange the piston rings 13.

By removing further the bridges 37, a much wider annular gap $z$ is formed through which the working piston itself is accessible, so that any desired work can be done on the latter such as withdrawing the two-part guiding sleeve 38, tightening the stuffing boxes 39 of the piston cooling chamber, driving home the connecting screw bolts 52 and so on.

In order to prevent the exhaust gases still under tension from arriving through the inspecting and cleansing ports 6 in the inspecting chamber 9, when the piston is in one of its end positions, the chamber 9 may be maintained under a slight pressure above atmospheric, e. g. by introducing compressed air, that prevents the exhaust gases from penetrating it from the working cylinder.

Besides in internal combustion engines, the invention is of course well adapted to be employed in piston engines of any other kind, e. g. steam engines, compressors etc. both of vertical and horizontal construction.

What I claim, is:—

1. In a piston engine a cylinder having perforations in its wall adapted to make the piston rings visible and accessible.

2. In a piston engine a cylinder having perforations in its wall distributed on its entire circumference at a common level and adapted to make the piston rings visible and accessible.

3. In a piston engine a cylinder having perforations in its walls distributed on its entire circumference and situated at the end of the piston stroke, said perforations being adapted to make the piston rings visible and accessible.

4. In a piston engine a cylinder having perforations in its wall distributed on its entire circumference at the end of the piston stroke, and adapted to make the piston rings visible and accessible, an outer chamber being arranged around the cylinder, which chamber includes said perforations.

5. In a piston engine a cylinder having perforations in its wall distributed on its entire circumference at the end of the piston stroke and adapted to make the piston rings visible and accessible, an outer chamber being arranged around the cylinder, which chamber includes said perforations, and means for maintaining a pressure above atmospheric in said chamber.

6. In a piston engine a cylinder having perforations in its wall distributed on its entire circumference at the end of the piston stroke and adapted to make the piston rings visible and accessible, an outer chamber arranged around the cylinder and including said perforations, and means arranged in said chamber for spurting jets of a cleansing means onto said piston rings through said perforations.

7. In a piston engine a cylinder having perforations in its wall distributed on its entire circumference at the end of the piston stroke and adapted to make the piston rings visible and accessible, an outer chamber arranged around the cylinder and including said perforations, means arranged in said chamber for spurting jets of a cleansing means onto said piston rings through said perforations, and means for leading off the superfluous cleansing means from said chamber.

8. In a piston engine a cylinder having perforations in its wall distributed on its entire circumference at the end of the piston stroke and adapted to make the piston rings visible and accessible, an outer chamber arranged around the cylinder and including said perforations, openings in the wall of said chamber adapted to make said perforations visible and accessible, and easily detachable covers for said openings.

9. In a piston engine a cylinder having perforations in its wall distributed on its entire circumference at the end of the piston stroke and adapted to make the piston rings visible and accessible, an outer chamber arranged around the cylinder and including said perforations, openings in the wall of said chamber adapted to make said perforations visible and accessible, and transparent covers for said openings.

10. In a piston engine a cylinder having perforations in its wall distributed on its entire circumference and extending in a direction inclined relatively to the cylinder axis at the end of the piston stroke and adapted to make the piston rings visible and accessible.

11. In a double-acting two stroke cycle internal combustion engine a cylinder having two groups of inlet and outlet ports in its wall, perforations in said wall distributed on its entire circumference between said two groups of ports and adapted to make the piston rings visible and accessible.

12. In a double-acting two stroke cycle internal combustion engine a cylinder having two groups of inlet and outlet ports in its wall, perforations in said wall distributed on its entire circumference between said two groups of ports and adapted to make the piston rings visible and accessible, an outer chamber arranged around the cylinder and including said perforations, means arranged in said chamber for spurting jets of a cleansing means onto said piston rings through said perforations, and means arranged in connection with said perforations and adapted to wipe off said cleansing means from said piston rings.

13. In a two stroke cycle internal combustion engine a cylinder having inlet and outlet ports in its wall, collecting chambers in connection with said ports and arranged around the cylinder, and openings in the outer wall of said chambers adapted to make said inlet and outlet ports visible and accessible.

14. In a piston engine a cylinder having a liner composed of two cylindrical parts arranged at a certain distance apart from one another, bridge pieces detachably inserted between said two parts at distances apart from one another and having internal guide faces for the piston reciprocating in said cylinder, a circular chamber on said cylinder including said bridge pieces, and openings in said chamber adapted to make said bridge pieces visible and accessible.

15. In a piston engine a cylinder having a liner composed of two cylindrical parts arranged at a certain distance apart from one another, annular guide faces along the edges opposite each other, of said parts, bridge pieces detachably inserted between said two parts at distances apart from one another and fitting on said guide faces, internal guide faces on said bridge pieces for the piston reciprocating in said cylinder, a circular chamber arranged around said cylinder and including said bridge pieces, and openings in said chamber adapted to make said bridge pieces visible and accessible.

16. In a piston engine a cylinder having a liner composed of two cylindrical parts arranged at a certain distance apart from one another, annular guide faces along the edges opposite each other, of said parts, bridge pieces detachably inserted between said two parts at distances apart from one another and fitting on said guide faces, internal guide faces on said bridge pieces for the piston reciprocating in said cylinder, a circular chamber arranged around said cylinder and including said bridge pieces, and openings in said chamber adapted to make said bridge pieces visible and accessible, said bridge pieces being fastened only on one of said liner parts.

17. In a two stroke cycle internal combustion engine a cylinder having inlet and outlet ports in its wall, intermediate pieces detachably inserted between said inlet and outlet ports, collecting chambers in connection with said ports and arranged around the cylinder, and openings in the outer wall of said chambers adapted to make said ports and intermediate pieces visible and accessible.

18. In a piston engine a cylinder having a liner composed of two cylindrical parts arranged at a certain distance apart from one another, the edges turned toward one another of said liner parts extending along wave lines with the crests and depressions opposite one another, bridge pieces detachably inserted between said two liner parts and located in the depressions of said wave-lined liner part edges, internal guide faces arranged on said bridge pieces for the piston reciprocating in said cylinder, the crests of said wave-lined liner part edges and the guide faces of said bridge pieces overlapping each other in the longitudinal direction of the cylinder, a circular chamber arranged around said cylinder and including said bridge pieces, and openings in said chamber adapted to make said bridge pieces visible and accessible.

19. In a piston engine a cylinder having a liner composed of two cylindrical parts arranged at a certain distance apart from another, the edges turned toward one another of said liner parts intending along wave lines with the crests and depressions opposite one another, bridge pieces detachably inserted between said two liner parts and located at the crests of said wave-lined liner parts, longitudinal projections detachably fixed on said liner parts in the depressions of their wave-lined edges and having a length so as to leave a gap between two companion ones, said bridge pieces and projections having internal guide faces for the piston reciprocating in said cylinder, a circular chamber arranged around said cylinder and including said bridge pieces and projections, and openings in said chamber adapted to make said bridge pieces visible and accessible.

20. In a piston engine a cylinder having perforations in its wall at the end of the piston stroke and adapted to make the piston rings visible and accessible, a chamber surrounding said cylinder and including said perforations, and sources of light arranged in and inspecting holes on, said chamber.

21. In a piston engine a cylinder having perforations in its wall at the end of the piston stroke and adapted to make the piston rings visible and accessible, a chamber surrounding said cylinder and including said perforations, sources of light arranged in and inspecting holes on, said chamber, and means for making flash said sources of light only upon the piston rings being opposite said perforations.

22. In a piston engine a cylinder having perforations in its wall at the end of the piston stroke and adapted to make the piston rings visible and accessible, a chamber surrounding said cylinder and including said perforations, inspecting holes on and means for producing electric light in said chamber, and means adapted to be controlled by a moving part of the engine for producing said electric light intermittently only upon the piston rings being opposite said perforations.

23. In a piston engine a cylinder having perforations in its wall at the end of the piston stroke and adapted to make the piston rings visible and accessible, a chamber surrounding said cylinder and including said perforations, inspecting holes on and means for producing electric light in, said chamber, means adapted to be controlled by a moving part of the engine for producing said electric light intermittently only upon the piston rings being opposite said perforations, and means for shifting the moment of flash of said light.

24. In a piston engine as specified in claim 14 a piston having piston rings which consist each of at least two parts and are arranged in staggered relation to one another on said piston, and a spring inserted between each piston ring part and the piston and adapted to urge said ring parts outward.

25. An illuminating implement adapted to be introduced in the inspecting chamber as specified in claim 4, and comprising a handle, an adjustable mirror angularly fixed thereon and having a hole, a source of light arranged on said handle behind said mirror hole and a reflector mounted behind said source of light.

In testimony whereof I affix my signature.

RUDOLF PAWLIKOWSKI.